United States Patent
Takei et al.

(10) Patent No.: US 8,178,223 B2
(45) Date of Patent: May 15, 2012

(54) PERPENDICULAR MAGNETIC RECORDING MEDIUM

(75) Inventors: Hisako Takei, Nishitokyo (JP); Chiseki Haginoya, Tokyo (JP); Hiroshi Suzuki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 12/365,186

(22) Filed: Feb. 4, 2009

(65) Prior Publication Data

US 2009/0207527 A1 Aug. 20, 2009

(30) Foreign Application Priority Data

Feb. 20, 2008 (JP) ................... 2008-038163

(51) Int. Cl.
G11B 5/66 (2006.01)
(52) U.S. Cl. ........................................ 428/835
(58) Field of Classification Search .......... None
See application file for complete search history.

(56) References Cited

U.S. PATENT DOCUMENTS

| | | | |
|---|---|---|---|
| 7,604,880 B2 * | 10/2009 | Takai et al. ........... | 428/833.3 |
| 7,741,229 B2 * | 6/2010 | Suwa et al. ........... | 438/737 |
| 2003/0112560 A1 | 6/2003 | Takeshita et al. | |
| 2005/0233176 A1 | 10/2005 | Takai et al. | |
| 2006/0063042 A1 * | 3/2006 | Takai et al. ........... | 428/848.2 |
| 2006/0222897 A1 * | 10/2006 | Kamata et al. ........ | 428/826 |

FOREIGN PATENT DOCUMENTS

| JP | 2000-195042 | 7/2000 |
|---|---|---|
| JP | 2005-276325 | 10/2005 |
| JP | 2006-092632 | 4/2006 |
| JP | 2006-196143 | 7/2006 |

OTHER PUBLICATIONS http://www.merriam-webster.com/dictionary/alternate. 2011.*
Japanese Office Action issued on Jun. 23, 2011, in counterpart Japanese application No. 2008-038163, 3 pages. Japanese Patent Office. Japan.

* cited by examiner

*Primary Examiner* — Holly Rickman
(74) *Attorney, Agent, or Firm* — Antonelli, Terry, Stout & Kraus, LLP.

(57) ABSTRACT

In a magnetic recording medium, there are realized an improvement in surface planarity and a reduction in characteristic degradation. The magnetic recording medium is fabricated so that the upper layer of a recording layer and a refill layer are formed of the same material.

7 Claims, 3 Drawing Sheets

PERPENDICULAR MAGNETIC RECORDING MEDIUM

CLAIM OF PRIORITY

The present application claims priority from Japanese application JP 2008-38163 filed on Feb. 20, 2008, the content of which is hereby incorporated by reference into this application.

BACKGROUND OF THE INVENTION

1. Field of the Invention

The present invention relates to a high-recording density magnetic recording device and, more particularly, to a magnetic recording medium of a hard disk unit.

2. Background Art

Along with an increase in the recording density of a magnetic recording device, noise due to an disorder in the magnetized state of track edges arising in association with an increase in track density, a side-read phenomenon arising due to reading from adjacent tracks, damage to a magnetic recording medium due to a decreased floating amount of a magnetic head, and the like have become extremely critical issues. In order to solve these problems, there is an expectation for the realization of a discrete track medium the tracks of which are physically divided from one another.

In recent years, a study has been made of a discrete track medium and there is known a variety of materials, processes and the like used to physically fill up intertrack spaces (see JP Patent Publication (Kokai) Nos. 2006-196143 and 2006-92632). Since a concavo-convex shape remains on a surface of a recording medium if a refill material is formed on a convex portion of a track and a concave portion between tracks, the medium surface needs to be planarized. As a method for removing superfluous layers of resist and the refill material on the convex portion, there is known a liftoff method for removing the resist and the refill material adhering to the periphery of the resist using an organic solvent. In addition, a dry etching method, CMP and the like capable of selectively removing only the refill material on the convex portion have been applied on trial. As the dry etching method, there is known a method in which, for example, a stopper layer is formed on a magnetic recording layer and the entire medium surface including a concavo-convex shape is filled with the refill material. Next, only a mask material is selectively dry-etched by taking advantage of a etching rate ratio between the refill material and the mask material, in order to remove a superfluous amount of refill material formed on convex portions (JP Patent Publication (Kokai) No. 2006-196143).

SUMMARY OF THE INVENTION

In a discrete track medium having a conventional structure, a magnetic recording layer is formed on predetermined tracks and desired magnetic characteristics are obtained by a photolithography step or a nanoimprint step, and an etching step, an intertrack filling step and a surface planarization step, when forming intertrack grooves including a continuous magnetic recording layer. As an example, FIG. 1 illustrates a cross-sectional shape when a recording medium is cut in a track direction. A seed layer 12, a soft underlayer 13, a first intermediate layer 14, a magnetic recording layer 15, a refill layer 19, a protective film 21, and a lubricant layer 20 are laminated on a substrate 11 made of glass or the like. The width of the recording layer in a direction vertical to the film thickness direction thereof is defined as a track width 41. In addition, according to, for example, JP Patent Publication (Kokai) No. 2006-196143, tracks are formed by ion beam etching, reactive ion beam etching or the like, using a resist formed by photolithography on a mask layer on the magnetic recording layer as a mask. This shape is formed by forming a resist pattern on the magnetic recording medium and performing ion beam etching using this resist pattern as a mask. After this, the resist is removed and a refill material is formed.

According to, for example, JP Patent Publication (Kokai) No. 2006-196143, an oxide film made of $SiO_2$ or the like formed by sputtering or a nonmagnetic metal is used as the refill material. Next, the substrate surface is planarized using ion beam etching, reactive ion etching (RIE) or the like, in order to remove superfluous portions of the refill material.

At the time of planarization, however, the conventional manufacturing method has had the following problems:

- deterioration in the planarity of the medium surface as a result of an etching rate difference being produced between convex and concave portions of the refill layer 19;
- characteristic degradation in the upper portion of the magnetic recording layer due to argon ion collision in ion beam etching; and
- increase in the number of manufacturing steps caused by inserting a stopper layer on the recording layer.

According to the present invention, the upper layer of the magnetic recording layer of a track and the refill layer are made of the same material, and an intermediate layer higher in etching rate than the refill material is inserted in the upper layer of the track. Thus, it is possible to planarize the medium surface when etching is finally completed.

After the magnetic recording layer is film-formed, a second intermediate layer 16 and a third intermediate layer 17 are film-formed sequentially using the same material as that of the refill material. Then, a resist layer 47 is laminated on the third intermediate layer 17. Next, the resist layer 47 is processed into the shape of a resist pattern layer 18 for the purpose of track pattern formation. After patterning is performed on the third intermediate layer 17, the second intermediate layer 16 and the magnetic recording layer 15 using this mask pattern, the resist pattern layer 18 is removed.

A refill material to be formed next is the same as that of the second intermediate layer 16. Since the ion milling rate of the third intermediate layer 17 is approximately three times as fast as those of the refill layer 19 and the second intermediate layer 16, the etching rate difference between concave and convex portions is adjusted. Thus, it is possible to realize an even more planar surface shape. In addition, there is no need for a stopper layer since the refill layer 19 and the second intermediate layer 16 are resistant to ion milling. Thus, it is possible to simplify a manufacturing process. Since the upper layer 16 of the magnetic recording layer 15 is a protective layer, it is also possible to reduce characteristic degradation due to argon ion collision. As a result, there are realized an improvement in surface planarity, a reduction in the number of manufacturing steps, and a reduction in characteristic degradation.

Firstly, the discrete track medium of the present invention makes it possible to enhance the planarity of a medium surface by forming the third intermediate layer 17 for adjusting the etching rate. Secondly, it is possible to reduce the number of manufacturing steps by forming the refill layer 19, the protective layer 21 and the second intermediate layer 16 from the same material. In addition, it is possible to reinforce the discrete track medium against impact when a magnetic head collides with a magnetic disk.

EXPLANATION OF REFERENCE NUMERALS

Figure 1:
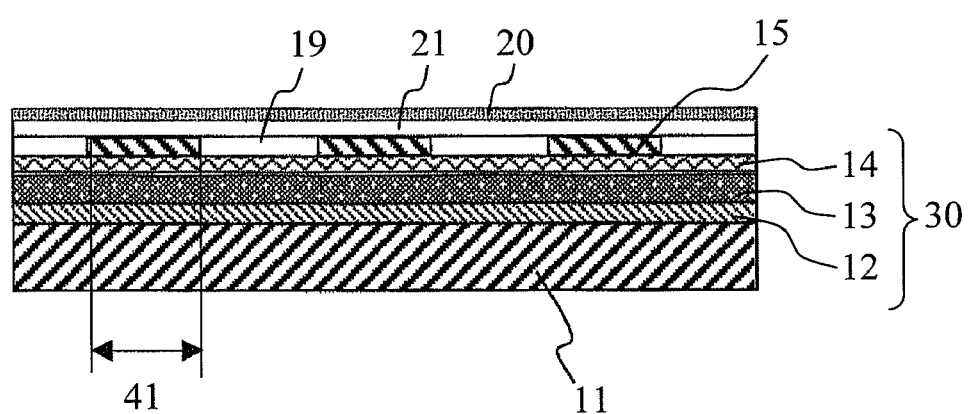
FIG. 1 is a cross-sectional view of a conventional magnetic recording medium.

11 Substrate
12 Seed layer
13 Soft underlayer
14 First intermediate layer
15 Magnetic recording layer
16 Second intermediate layer
17 Third intermediate layer
18 Resist pattern layer
19 Refill layer
20 Lubricant layer
21 Protective layer
30 Three layers composed of seed layer 12, soft underlayer 13 and first intermediate layer 14
41 Track width
47 Resist layer
250 Magnetic disk
251 Spindle motor
252 Magnetic head
253 Access Arm
254 Actuator
255 Signal processing unit

DETAILED DESCRIPTION OF THE PREFERRED EMBODIMENTS

In the best mode for carrying out the present invention, the upper layer of the magnetic recording layer of a track and the refill layer are made of the same material, and a coordination layer higher in etching rate than a refill material is inserted in the upper layer of the track.

[Embodiment 1]

Hereinafter, specific means for fabricating the magnetic recording medium of the present invention will be described using FIG. 2.

Figure 2A:
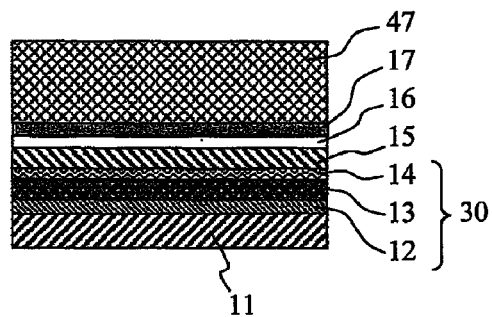
FIG. 2 is a process drawing illustrating the exemplary manufacturing steps of the magnetic recording medium of the present invention.

As shown in FIG. 2A, a seed layer 12, a soft underlayer 13, a first intermediate layer 14, a magnetic recording layer 15, a second intermediate layer 16, a third intermediate layer 17, and a resist 47 are laminated on a substrate 11.

The substrate 11 is made of glass, alumina, silicon or the like. The magnetic recording layer 15 is composed of, for example, a granular perpendicular recording medium formed of a Co, Cr and Pt-based alloy and a nonmagnetic substance, such as $SiO_2$. The second intermediate layer 16 and the refill material 19 are made of diamond-like carbon (DLC) which is a nonmagnetic material. The thickness of the second intermediate layer 16 is preferably 3 nm or larger since the minimum film thickness for DLC to function as a protective layer is 3 nm. The third intermediate layer 17 is formed of, for example, $SiO_2$ or resist and is preferably have a thickness equal to or larger than the thickness of the second intermediate layer 16. Hence, the film thickness of the third intermediate layer 17 is set to approximately 10 nm. As will be described later, the film thickness is set to 10 nm as a thickness with which planarity is finally reached, taking into consideration the etching rate difference between DLC and $SiO_2$.

Examples of the resist include a resist used for photoresist masks that can be subjected to exposure and patterning using electron beams and a resist used for nanoimprinting.

Figure 2C:
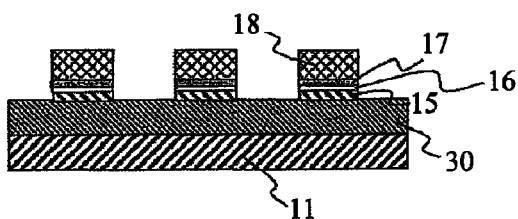
Figure 2B:
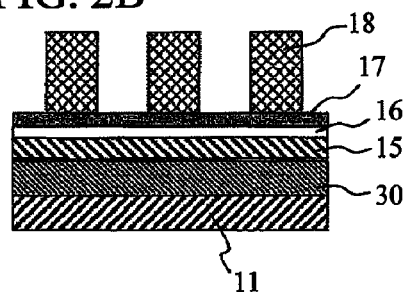

Next, as shown in FIG. 2B, patterning is performed on the resist layer 47 using an electron beam lithography method or a nanoimprint method, to form a resist pattern layer 18.

Using a dry etching process such as ion beam etching, the structure of the resist pattern 18 is transferred onto the third intermediate layer 17, the second intermediate layer 16 and the magnetic recording layer 15, as shown in FIG. 2C, with the resist pattern 18 used as a mask. The magnetic recording layer can be etched using an ion beam etching method or a reactive ion etching (RIE) method.

The resist pattern 18 is removed by means of RIE, using an oxygen gas or the like, or ashing. If at this time, there is the re-deposition on the sidewalls of the resist 18, third intermediate layer 17, second intermediate layer 16 or magnetic recording layer 15, the re-eposition may be removed by ion beam etching or the like.

The third intermediate layer 17, if made of $SiO_2$ or the like, is resistant to an RIE gas used to remove the resist pattern 18. Accordingly, the resist pattern 18 can be removed by an ion beam etching method using an etching gas containing an oxygen gas.

Figure 2D:
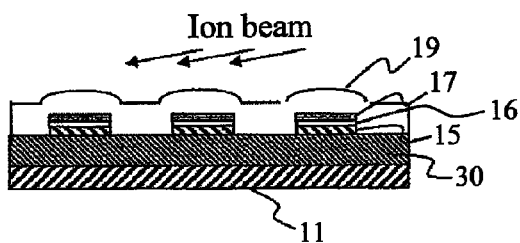

After this, as shown in FIG. 2D, a refill layer 19 is formed. As the material of the refill layer 19, a material used for the second intermediate layer 16 is used. In the present embodiment, DLC, for example, can be mentioned as a candidate for the material. The thickness of the refill layer 19 is made to be larger than the sum of the thicknesses of the third intermediate layer 17, second intermediate layer 16 and magnetic recording layer 15, so that the refill material is fully buried in intertrack grooves and the refill layer 19 is flush with the second intermediate layer 16 when planarized and such that the surfaces of the refill material and the second intermediate layer are appeared alternatively.

SOG that can be hardened at or below such a temperature as not to degrade the magnetic recording characteristics or $SiO_2$ deposited by a sputtering method may be used as the refill layer 19. In this case, however, the material of the third intermediate layer 17 serving as a coordination layer for adjusting the etching rate must be higher in ion beam etching rate than SOG or $SiO_2$.

Next, the rugged surface of the third intermediate layer 17 is planarized using ion beam etching. In the case of ion beam etching, the incident angle of a beam is within the range of $80°±5°$, assuming that the normal line of the substrate 11 is $0°$.

The reason for the angle of etching in the step of FIG. 2D being within the range from $75°$ to $85°$ is that if the angle is smaller than $75°$, a beam is projected in a similar manner onto both concave portions and convex portions. Thus, the third intermediate layer 17 is etched back with the concavo-convex shape thereof kept as is, resulting in a failure to planarize the surface. In addition, if the angle is larger than $85°$, the beam is projected almost in parallel with the substrate. Thus, it is not possible to project the beam onto the entire area of the substrate.

Figure 2E:
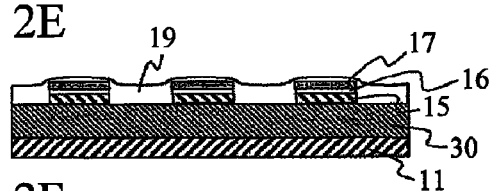
Figure 2F:
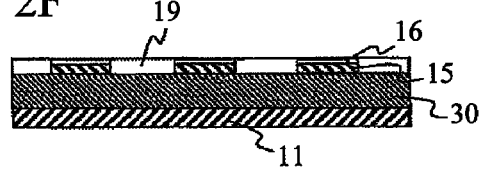

At the time of etching, the glass substrate is spinning around an axis oriented in the direction of the substrate's normal line. As etching proceeds, the concavo-convex shape of the surface of the refill layer 19 approximates to planarity, as shown in FIG. 2E. When the corners of the third intermediate layer 17 begin to show up, the difference of elevation between concavities and convexities on the surface of the refill layer 19 is 7 or 8 nm. In consideration of a thickness at which etching is performed for planarization, the 10 nm-thick third intermediate layer 17 and the approximately 10 nm-thick refill layer 19 on the third intermediate layer 17 remain in track portions, and DLC is formed in intertrack groove portions to a thickness of approximately 13 nm. Since $SiO_2$ is three times higher in etching rate, when compared with DLC, convex portions are selectively etched. Thus, the time taken to etch the convex portions equals the time taken to etch the track portions and the intertrack groove portions. Consequently, it is possible to realize planarity, as shown in FIG. 2F.

The state of etching can be monitored during etching by means of Secondary Ion Mass Spectroscopy or the like. Accordingly, the third intermediate layer 17 may have the function as an etching monitor layer.

If Secondary Ion Mass Spectroscopy is carried out concurrently with ion beam etching, it is known, at the moment a signal from the third intermediate layer 17 disappears, that the surfaces of the second intermediate layer 16 and the refill layer 19 have aligned with each other. Accordingly, etching may be finished at this moment.

Figure 2G:
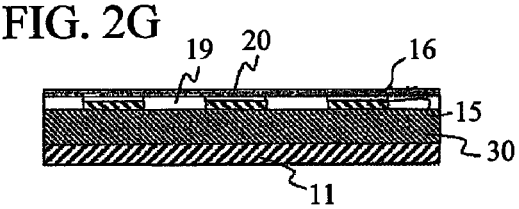
Figure 2H:
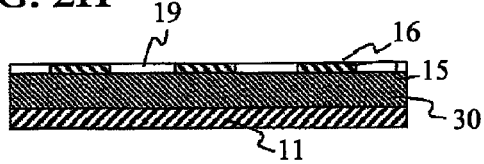

Since the second intermediate layer 16 is the same in etching rate as the refill layer 19, the layers may be etched several nanometers further, so as not to expose the surface of the magnetic recording layer 15 (see FIG. 2H).

As shown in FIG. 2F, the second intermediate layer 16 on the convex portions of the pattern and the intertrack refill material 19 that remain after the completion of ion beam etching may serve also as protective layers. For this reason, in the present invention, it is possible to omit a step of forming a protective layer following a planarization step.

A lubricant layer 20 made of a fluorine-based perfluoropolyether (PEPE) lubricant is coated on the medium surface using a dipping method when the refill layer 19 is planarized. This is because a refill material on the upper portion of the magnetic recording layer 15 has the function as a protective layer. The magnetic recording medium is thus completed, as shown in FIG. 2G.

[Embodiment 2]

In the same way as in embodiment 1, a magnetic recording medium is fabricated according to the steps of FIGS. 2A through to 2F.

Figure 2I:
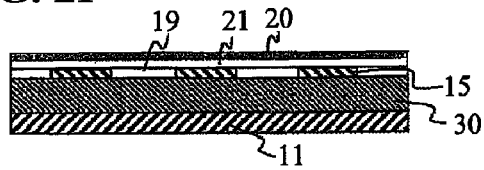

If argon ions have impinged on the surface of the magnetic recording medium at the time of planarization and DLC of the uppermost surfaces of the second intermediate layer 16 and the refill layer 19 can no longer function as a protective layer, etching or ashing is performed up to a refill layer in the upper layer of the magnetic recording layer 15, as shown in FIG. 2H, thereby uniformly removing the refill layer 19 and the second intermediate layer across the medium surface. Next, as shown in FIG. 2I, a protective layer is once again formed to a thickness of 4 nm, and then a lubricant is coated thereon. Thus, it is possible to still maintain planarity.

Even if the DLC of the uppermost surfaces of the second intermediate layer 16 and the refill layer 19 suffers damage when planarization is performed using a chemical-mechanical polishing method (CMP) or gas cluster ion beams (GCIB), it is possible to also use the steps of embodiment 2.

[Embodiment 3]

Figure 3:
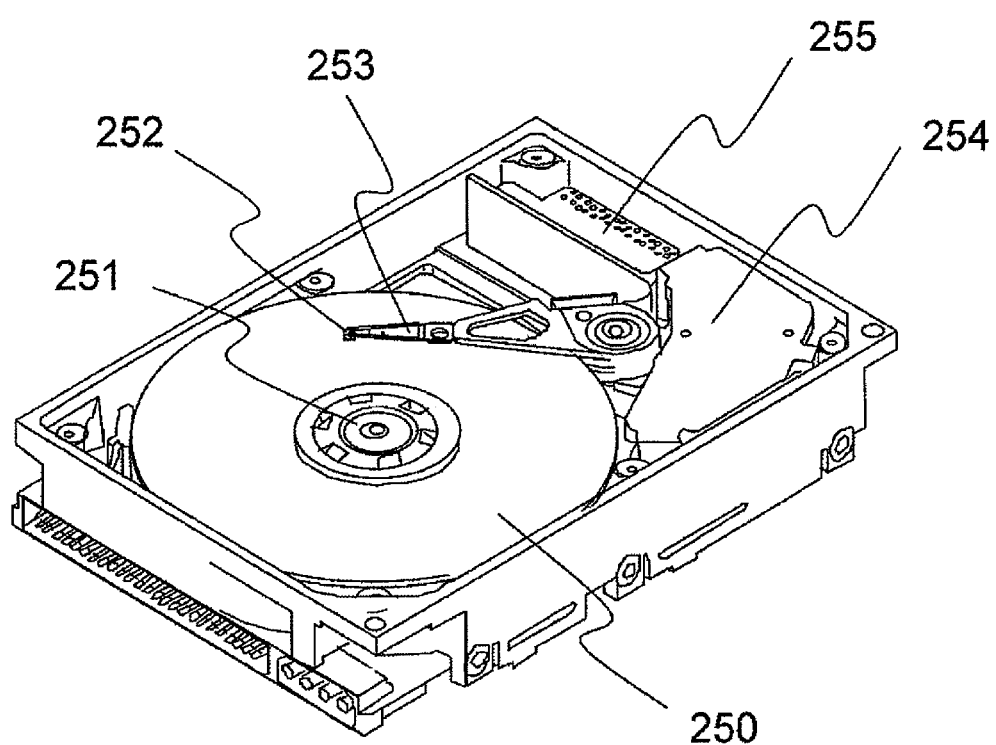
FIG. 3 is a conceptual drawing of a magnetic recording and reading device.

FIG. 3 is a schematic view illustrating one example of a magnetic disk unit using a magnetic disk of the present invention. This magnetic disk unit is configured with a magnetic disk 250, a spindle motor 251, a magnetic head 252, an access arm 253, an actuator 254, a Signal processing unit 255, and the like. A magnetic disk having a magnetic recording layer is rotated by the spindle motor 251 to write and read data using the magnetic head 252. A magnetic head is located at the leading end of the access arm 253, and the actuator 254 decides the magnetic head position of the radial direction on the magnetic disk.

The refill material 19 is made of DLC, which is a material conventionally used as a protective layer. There is a case that the leading end of the magnetic head 252 collides with the surface of the magnetic disk 250 when the magnetic disk 250 and the magnetic head 252 are actually in operation as a hard disk drive. Hence, there is concern that a structural distortion arising due to impact at this moment in the magnetic recording layer 15, the first intermediate layer 14, the soft underlayer 13 and the like may cause characteristic degradation. However, if intertrack spaces are filled with such a material as DLC having a high degree of hardness, the material has the function of reducing structural disorder cased by impact.

The present invention can also be applied to, for example, patterned media.

What is claimed is:

1. A perpendicular magnetic recording medium in which tracks in a magnetic recording layer are divided from one another by a nonmagnetic refill material, comprising:
   a substrate;
   a seed layer, a soft underlayer and a first intermediate layer sequentially formed on the substrate; and
   a magnetic recording layer formed on the first intermediate layer and a second intermediate layer formed directly on the magnetic recording layer;
   wherein the second intermediate layer and the refill material are formed of DLC,
   wherein a flat DLC surface of the second intermediate layer is flush with a flat DLC surface of the refill material, and the flat DLC surface of the second intermediate layer and the flat DLC surface of the refill material are appeared alternatively as an uppermost surface of a protective layer, and
   wherein the refill material is a single layer, and a thickness of the refill material is thicker than that of the second intermediate layer.

2. The perpendicular magnetic recording medium according to claim 1, wherein the refill material comprises diamond-like carbon.

3. A perpendicular magnetic recording medium including a structure according to claim 1 on at least one surface of the substrate.

4. A perpendicular magnetic recording medium including a structure according to claim 2 on at least one surface of the substrate.

5. A perpendicular magnetic recording device, comprising:
   a perpendicular magnetic recording medium including, on the substrate thereof, a seed layer, a soft underlayer, a first intermediate layer, a magnetic recording layer and a second intermediate layer formed directly on the magnetic recoding layer,
   wherein tracks in the magnetic recording layer are divided from one another by a nonmagnetic refill material made of DLC and the second intermediate layer is made of DLC;
   wherein a flat DLC surface of the second intermediate layer is flush with a flat DLC surface of the nonmagnetic refill, and the flat DLC surface of the second intermediate layer and the flat DLC surface of the refill material are appeared alternatively as an uppermost surface of a protective layer;
   wherein the refill material is a single layer, and a thickness of the refill material is thicker than that of the second intermediate layer,
   a spindle motor rotating the recording medium;

a magnetic head writing date to the recording medium and reading data written to the recording medium; and an actuator positioning the magnetic head on the recording medium.

6. The perpendicular magnetic recording device according to claim 5, wherein the refill material comprises diamond-like carbon.

7. A perpendicular magnetic recording device including a structure according to claim 1 only on one surface of the substrate.

* * * * *